Dec. 23, 1958  R. SCHÖN  2,866,110
ROLLING ELECTRIC MACHINE WITH INCREASED TORQUE
Filed Dec. 21, 1953  5 Sheets-Sheet 1

INVENTOR.
Richard Schön

Dec. 23, 1958   R. SCHÖN   2,866,110
ROLLING ELECTRIC MACHINE WITH INCREASED TORQUE
Filed Dec. 21, 1953   5 Sheets-Sheet 2

INVENTOR.
Richard Schön

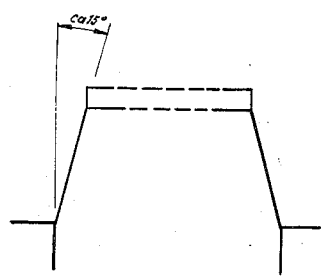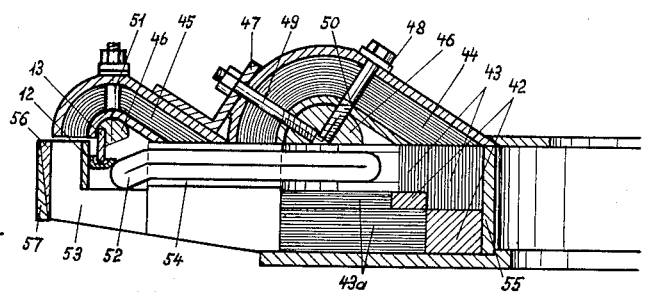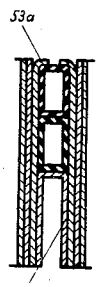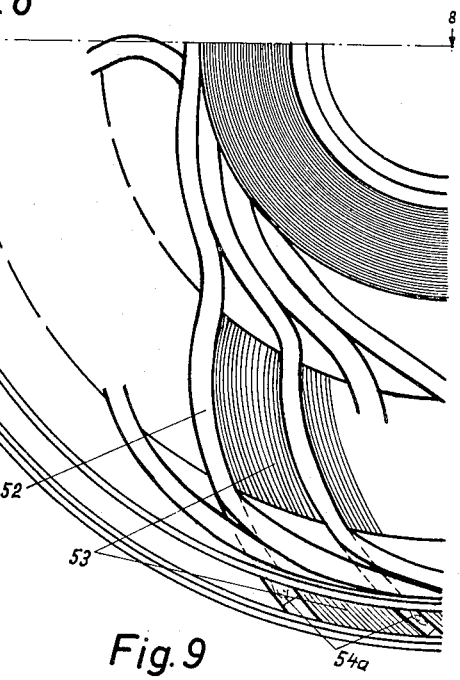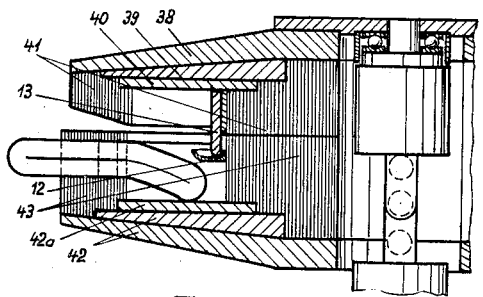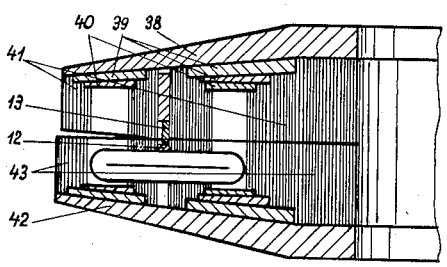

Dec. 23, 1958  R. SCHÖN  2,866,110
ROLLING ELECTRIC MACHINE WITH INCREASED TORQUE
Filed Dec. 21, 1953  5 Sheets-Sheet 4
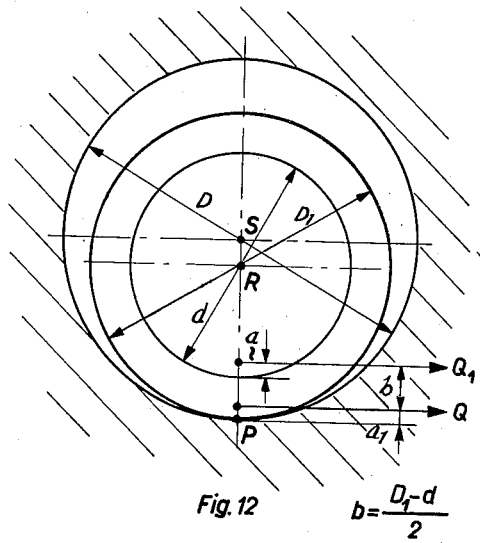
*Fig. 12*  $b = \dfrac{D_1 - d}{2}$
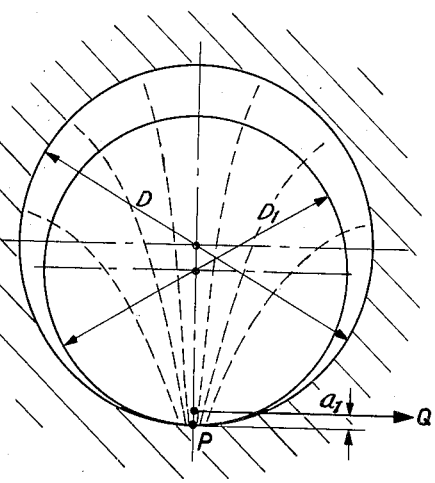
*Fig. 13*
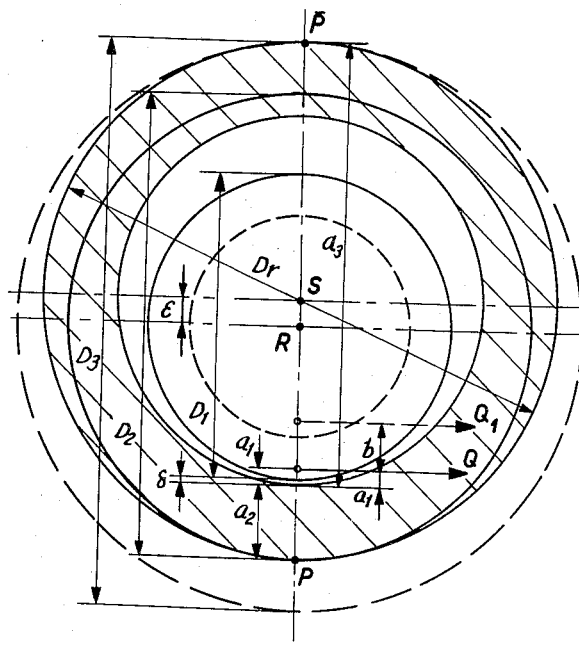
*Fig. 14*
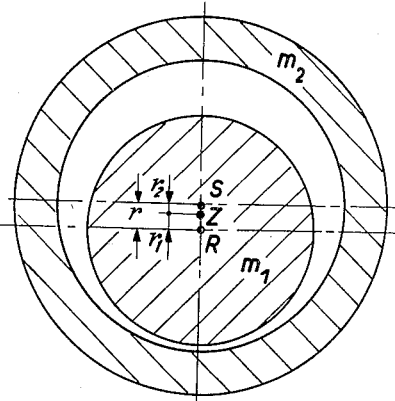
*Fig. 17*
$r_2 = r \cdot \dfrac{m_1}{m_1 + m_2}$
$a_2 = \dfrac{D_2 - D_1}{2}$ ; $M_2 = Q \cdot (a_2 + a_1)$
$a_3 = \dfrac{D_r + D_1}{2} + \varepsilon$ ; $M_3 = Q \cdot (a_3 - a_1)$
$\delta$ = shortest air path
INVENTOR.
Richard Schön Dec. 23, 1958          R. SCHÖN          2,866,110
ROLLING ELECTRIC MACHINE WITH INCREASED TORQUE
Filed Dec. 21, 1953          5 Sheets-Sheet 5

INVENTOR.
Richard Schön

United States Patent Office 2,866,110
Patented Dec. 23, 1958

2,866,110

ROLLING ELECTRIC MACHINE WITH INCREASED TORQUE

Richard Schön, Vienna, Austria

Application December 21, 1953, Serial No. 399,186

22 Claims. (Cl. 310—82)

This invention is concerned with a rolling electric machine and will be described below with particular reference to a commutatorless machine of that type though not being restricted thereto.

The general object of the invention is to provide a rolling electric machine distinguished by a relatively high starting torque and pul-out torque.

Commutatorless rolling electric machines developed so far are either of rather small size without laminated magnetic circuit or, for higher torques, with laminated structure, winding, and rolling contact track, are expensive in manufacture and technically imperfect. Excepting some small-size embodiments, practical constructions of relatively high power have not been disclosed.

The commutatorless rolling motor operates with a rotating homopolar field obtained in known way either by suppressing the negative half waves of the threephase rotary field by rectifiers, generating hereby a sixphase homopolar field, or by superposing a constant field, magnifying the positive half waves and suppressing the negative ones. The constant field may be obtained by a permanent magnet or by a winding energized by direct current.

As is known the cylindric roller can be pressed more advantageously against the friction track if the stator sheets are parallel to the shaft than if they are square to it, as usual for normal alternating current motors.

All these means, as said, are satisfying only with small sizes for getting the machine into step. For if the bore of a rolling machine increases, the friction and the electric torque increases approximately with the third, but the moment of inertia nearly with the fifth power and this leads, even with small pull-out torques, to a limit beyond which the rolling machine does not attain its normal speed of rotation within a semi-period: the machine cannot fall into step with the certainty required.

It is the object of my invention to displace the resultant of the eddy currents from the friction force or inversely, whereby to the synchronous torque gets added an asynchronous one and this, without increasing the losses in the roller, effects (1) a better starting for every size of machine (increased starting torque); (2) an increased pull-out torque; (3) an increased friction torque; (4) the limit for starting within a semi-period gets removed into the region of greater bores. The commutatorless rolling machine with increased torque is not only able to drive switches, starters, lifting machines etc. of every size, thus replacing geared asynchronous motors or direct current motors, but also to carry out short and frequent movements which up to now was only possible pneumatically or mechanically.

Such as the synchronous motor has been restricted to very small types as long as the starting and damping cage was not yet invented so the commutatorless rolling machine hitherto must persist being restricted to realisations of small size. The principle of displacing the working points of eddy currents and of friction force one from the other in direction of the shortest air path eliminates this restriction, shortens the starting time and saves active material. By applying a permanent magnet the rolling machine becomes a perfect control- and stop-motor requiring no friction clutch and friction brake, having hardly any gyrating mass.

The principle of displacing the two forces one from the other gives an enlargement of the lift arm and thereby the increased torque is the same for cylindric and for conic or plane rollers if the direction of the displacement in both cases is in the direction of the shortest air path i. e. square to the flux transition faces, being cylindric, conic or plane generally developable surfaces. Therefore the invention applys to every rolling machine, not only to cylindric rollers.

For connecting the roller with the rotating shaft, for the known conic or plane rolling machines with variable speed is disclosed ball, diametrically extending pin and socket, whence results a speed variation within every period of supply frequency, as with single cardan joints. This variating velocity is insupportable for higher torques. But a double cardan joint cannot be used as for cylindric rollers, because one shaft is slewable in the other and the third shaft (i. e. the middle one), remains freely movable. There is given a design for employing a double cardan joint even at conic rollers without which the invention would be incomplete.

Further objects of the invention are many other improvements required by heavier rollers of greater power producible with the enlarged lift arm as these: formation of stator's lamination by involute curves for distributed stator windings, compensation of the rollers gyrating mass use of rolling friction disk and track to insure the exact distance of the two engaging toothwheels, lamellations of the conic roller, conic double roller with three air gaps, permanent magnet with lamination put on and other means later described.

In what manner the working points of the said forces are to be displaced and what constructional means for this and for the other features of the invention are to be applied will be apparent from the following description of several illustrative embodiments thereof and schematic figures, which are shown in the accompanying drawings, in which Fig. 1 is a partly sectional elevation of an electric machine having a cylindrical roller.

Fig. 1a is a partly sectional front view of the machine shown in Fig. 1, taken in part on line 1a—1a.

Fig. 6 illustrates another embodiment of rolling machine having a plate-type roller, with wound laminations.

Fig. 7 shows as a detail a special arrangement of the contact track relative to the direction of contact pressure.

Fig. 8 shows another embodiment of an electric machine with a plate-core roller and a magnetic circuit surrounding both ends of the stator coil.

Fig. 9 is a top plan view of the stator of the machine shown in Fig. 8.

Fig. 10 shows a slot of the stator of Fig. 9, and

Fig. 11 shows a modification of Fig. 8.

Fig. 12 shows schematically the cross-section of a rolling machine.

Fig. 13 shows in cross-sectional view the magnetic field of the well-known cylindric rolling machine.

Fig. 14 shows schematically the friction tracks of a rolling machine with increased torque (cross-sectional view of a cylindric machine in normal projection or of a conic one in central projection from the vertex of the cone).

Fig. 17 shows the position of the centers of gravity of the stator and the roller and resulting center of gravity of both.

Figure 1:
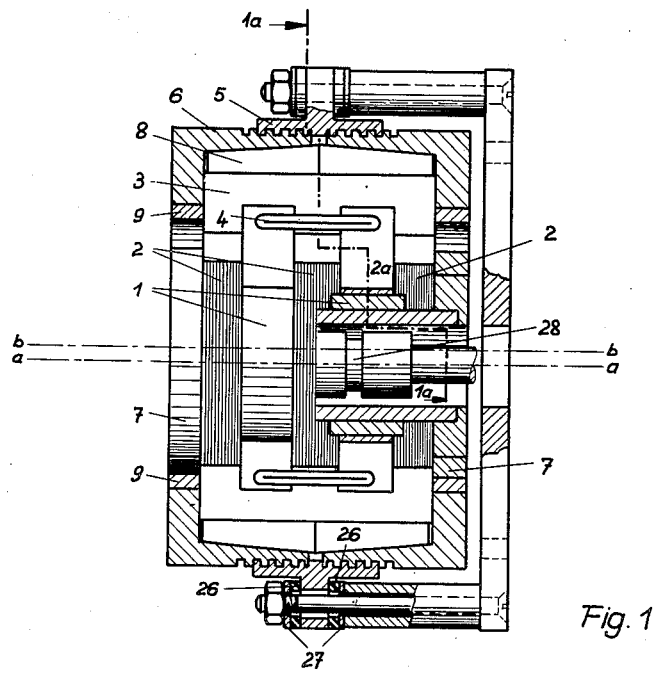

Since the rolling electric machine operates with rolling friction between the stator and roller, the speed (R. P. M.) of the point of contact between the roller and rolling contact track must be distinguished therein from the speed (R. P. M.) of the roller itself. Whereas the point of contact must revolve synchronouly with the rotating field of the machine practically immediately, the roller will rotate, e. g., in the case of the usual small differences between the cylindrical bore and cylindrical roller at very low speed oppositely to the sense of rotation of the rotating field. Further, the synchronizing torque, with which the center of gravity of the roller is maintained in synchronism, must be distinguished from the asynchronous torque, particularly the starting torque, whereby the roller is turned about the instantaneous pole i. e. the point of contact.

According to the invention the asynchronous starting torque can be increased, without increasing the losses in the roller, by giving the roller such a shape that the resultant force exercised by the roller currents is displaced from the point of contact between the roller and its friction track so that said force acts with a longer lever arm about the axis of instantaneous rotation.

On a larger rolling machine the start is more difficult, because the synchronous torque caused by the rotating magnetic attraction of the rotating field diminishes to zero and tries temporarily to drive the roller in the opposite direction, if it is not great enough to synchronise the roller in a semi-period. On the other hand the asynchronous force caused by the eddy currents or the currents in a starting cage practically does not change its direction, even during a longer time of starting and reaches its maximum, if the shortest air path corresponds with the maximum of the field. But this asynchronous resultant Q cannot produce any twisting force at well-known embodiments, because it is acting nearest to the contact point P (Fig. 12), which simultaneously represents the instantaneous pole of the revolving motion; for the radial position of the origin Q is determined by the narrowness of the maximum induction which is situated in the point of contact P, respectively in the shortest airpath. Illustrating this, Fig. 13 shows aproximately the distribution of lines of force for the well-known cylindric rolling machine. The asynchronous torque produced by the resultant Q amounts to $M_1 = Qa_1$, the shortest distance of the resultant Q from the point P being signed with $a_1$.

According to the invention, lamellar iron being put on the roller's ferromagnetic core with the diameter $d$ (Figs. 1 and 1a, or 12), the force exercised by the roller currents gets displaced from the working point Q to $Q_1$ by the distance $$b = \frac{D_1 - d}{2}$$

(Fig. 12). For the eddy currents almost do not appear in the lamellar region of the contact point P, but there, where the force lines enter into the roller's solid core with the diameter $d$. The asynchronous moment amounts now to $$M_1 = Q\left(a_1 + \frac{D_1 - d}{2}\right)$$

According to the invention the lever arm of the force Q can be enlarged to a greater extent by providing the roller with an additional rolling body, which is revolving in a rolling friction track of suitably larger diameter $D_r$, while the diameters of the rolling body and its track are so adapted that the magnetic core of the roller does not touch the stator bore, but remains separated from it by the shortest air path $\delta$, as shown schematically in Fig. 14, which illustrates the rolling machine by the example of one with cylindric roller. In this manner, the contact point P is in a greater distance from the current conducting part Q or $Q_1$ by the distance $a_2$ and the torque $M_2 = Q(a_1 + a_2)$, exercised by the force Q, has a higher value than the torque of a well-known rolling motor, the roller of which touches directly the stator bore; the lever arm of the force Q is here longer than in both antecedent cases by the distance $a_2$, i. e., the half of the difference $$\frac{D_2 - D_1}{2}$$

of diameters of the rolling body $D_2$ and the roller $D_1$ (Fig. 14).

Both means are fit for every rolling machine, the roller of which might be cylindric, conic or plain, where in well-known manner the cylinder is considered as cone with the apex angle of 0°, and the plane on the other side as cone with the apex angle of 180°. If the conic rolling machine takes the forms shown in the Figures 2, 6, 8, and 11, instead of the well-known form of disc, the resultant $Q_1$, herein produced by the roller currents, is spaced by the distance of $b$ in the direction of the corresponding shortest air path, i. e., square to the roller's conic flux transition face. Beyond this, the contact point P is displaced additionally by the distance $a_2$ (Fig. 2) in the direction of the shortest air path, i. e., square to the roller's conic flux transition face, producing additionally the lever arm of $Q_1$.

Figure 15:
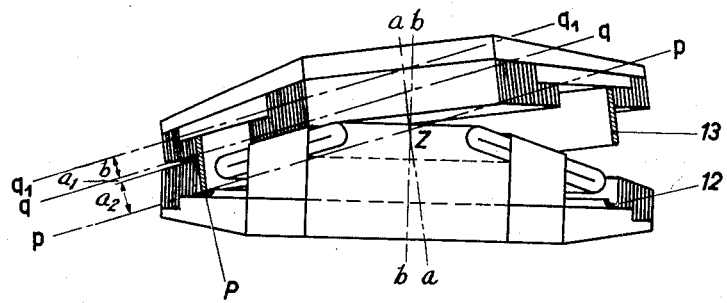
Fig. 15 shows the same for a conic machine in sectional view.

In Fig. 15 are indicated the distances $a_2$, $a_1$ and $b$, likewise the axes $p$—$p$, $q$—$q$ and $q_1$—$q_1$, corresponding to the equal signed distances and to the axes by the point P and by the origins of the forces Q and $Q_1$ of the cylindric roller in Fig. 14. If one conceives Fig. 14 as central projection from the vertex of a conic roller, it relates to conic rolling machines as well as to cylindric ones.

Figures 16, 18:
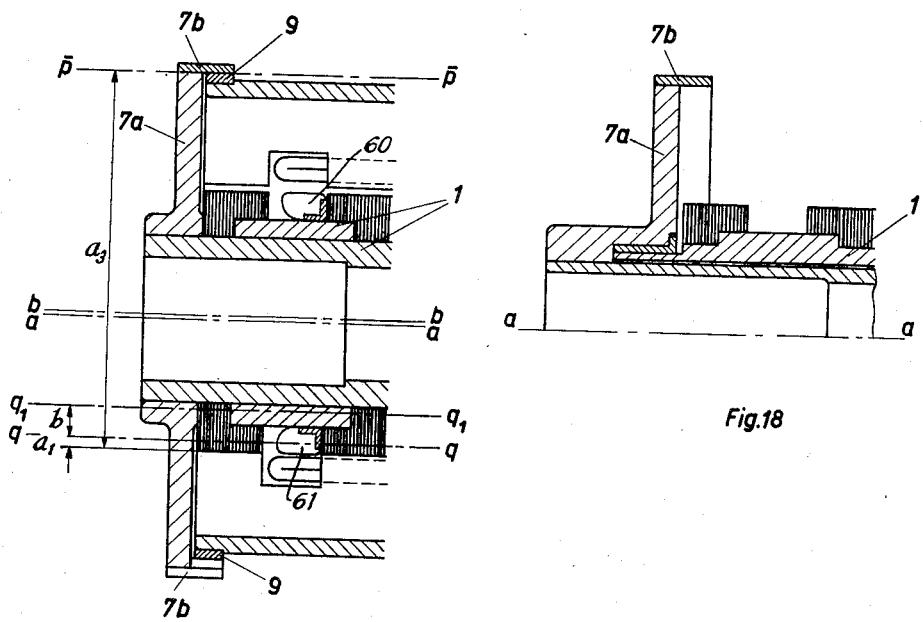
Fig. 16 shows in sectional view a cylindric roller with rolling body revolving outside of the friction track.
Fig. 18 shows schematically the structure of a cylindric rolling machine with increased torque and rotatably mounted roller.

In Fig. 14 is further indicated a diameter $D_3 = D_r + 2\epsilon$ and a displacement $a_3$ for the cylindric roller; it relates to the case in which the rolling body of the roller is revolving outside the rolling friction track, as shown in Figure 16. This construction gives the maximum displacement of the resultant force of eddy currents from the contact point P for given diameter $D_r$ of the friction track; utilizing entirely the advantages of the principle of the invention, it achieves the highest starting torques, and it has the additional advantage of driving the roller in the direction of the rotating field, which diminishes the iron losses and improves the efficiency. For the conic roller, this construction is possible, but somewhat troublesome.

It is a feature of the invention that this said displacement increases not only the asynchronous torque, but also the friction moment and the pull-out torque for the following reasons:

The friction moment is increased, because its lever arm is produced from $D_{1/2}$ to $D_{2/2}$ or $D_{3/2}$; the electric pull-out torque is also increased, because the asynchronous one has been increased, and advances the contact point, so that by suitably choosing the ratio of the asynchronous to the synchronous torque, the minimum reluctance is no longer corresponding to the resulting torque zero, but to almost half the normal torque. Likewise the pull-out torque increases by nearly the same amount. Only by the said displacement one can coordinate together the friction moment, the asynchronous torque for starting, and the synchronous torque for overload; for the friction moment is determined by the diameter of the friction track, the starting moment primarily by the displacement, and the synchronous moment for a given induction and gearing is likewise determined by the diameter of the friction track.

For producing the homopolar field, the ferromagnetic core may be a permanent magnet. It has the advantage, that the rotating field, developed by the stator current, must not be made homopolar by connecting the coils of the six phases in well-known mode across rectifiers, but by the field of the said permanent magnet. In that way not only the losses of the rectifiers disappear, but also the exciting current which must flow by the stator winding, diminishes to nearly $$\frac{1}{\sqrt{2}}$$

and the corresponding excitation loss to one half. The field of the permanent magnet remains even, when the supply tension is lacking, so that the friction pressure for maintaining a load endures hardly diminished. Therefore this construction is especially suitable for lifting machines. With larger bore the solid core becomes lighter, if it is formed in steps. This can be built for the cylindric roller by telescoped tubes and for the plane one by many disks or plates.

Figure 1A:
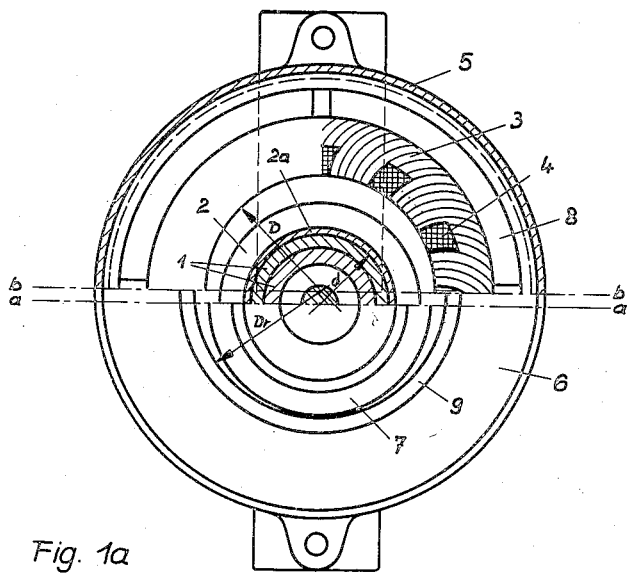

The cylindric roller shown in Figs. 1 and 1a is generally formed with two rolling bodies; for distributing an equal load on both tracks the flexible torque transmission member must be fixed at the centre between these two rolling bodies.

In Fig. 1, a cylindrical-type rolling electric motor of increased starting and service torque is shown for purposes of illustration. The roller 1 core carries the laminations 2, which are fixed in a suitable manner, e. g., by the supporting tubes 2a or by thrust plates pressed on and wedged in place. The roller 1 also carries friction disks 7 of nonmagnetic material. The magnetic circuit is closed through the stator laminations 3 and is excited by the distributed polyphase winding 4, which is embedded in the stator laminations 3 (Fig. 1a), which may be formed according to involute curves. The stator laminations are compressed concentrically by the composite stator tube 8. The pressure may be applied by through screws, or by an appropriate conical design of the two cover plates 6 in conjunction with the ring 5, which has a right-hand thread and a left-hand one, or other measures known per se. The cover plates carry the friction tracks 9 along which the friction disks 7 roll. The supporting tubes 2a may be made of copper or brass, to serve as a damping winding. The axes $a$—$a$ from the roller and $b$—$b$ from the stator are drawn.

In the form of roller shown, e. g., in Fig. 1, armature currents will occur not only at the transition face of the magnetic flux between the roller and the shortest air path, but also in the three protruding rings. Thus these currents are displaced from the transition face towards the axis according to Fig. 12. This displacement is further increased when the three protruding rings consist of transformer laminations; then the armature current will pass from these laminations into the solid tubular cylinder at a transition point having the diameter $d$. By this construction of the roller the effort arm, with which the roller current's driving force is effective, has been increased by half the difference between the bore diameter $D$ and the diameter $d$ of the solid tubular roller. Moreover, the diameter $D_r$ of the rolling friction track is chosen larger than the bore diameter $D$, which causes a further increase of the starting torque, without increasing the armature losses. The increase of the diameter of the friction track at the same time causes an increase of the transmitted torque at unchanged magnetic attraction and peripheral force. The maximum increase of the asynchronous torque may be achieved according to the invention when the rolling body of the roller is formed as disk 7a with ring 7b (Fig. 16) at the end of the roller and the contact track of the stator consists of a tube 9. Then the effort arm $$\frac{D_r + d}{2} + \epsilon$$

is obtained; $\epsilon$ being the distance between the axes $a$—$a$ and $b$—$b$.

To avoid the rectifiers mentioned in the beginning and to be independent from the supply tension for electric braking, the ferromagnetic core 1 in Figure 1 or the ferromagnetic plates 42, 42a in Figures 6, 8, 11 can be permanent magnets. The magnetisation can be effected in well known manner by a direct current rush.

Figure 2:
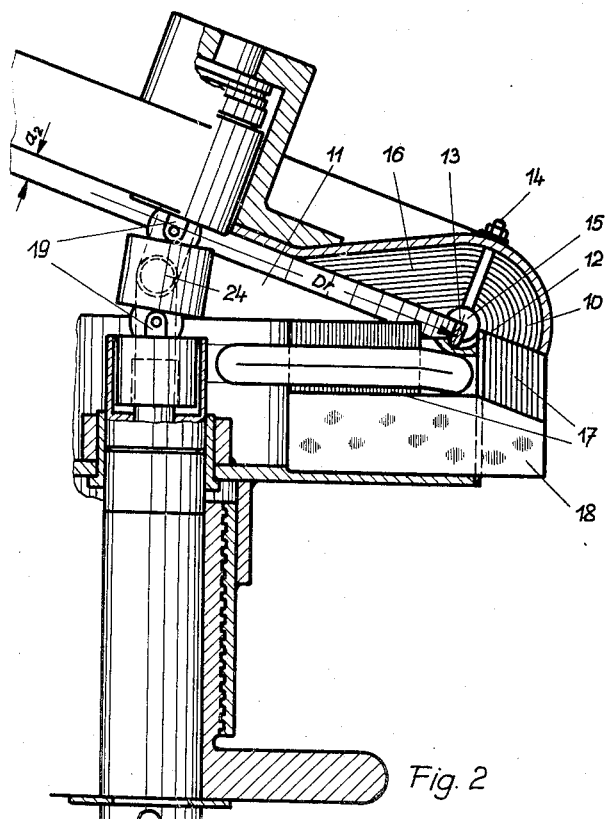
Figs. 2 and 3 are side views of electric machines having a plate-type roller and a novel torque transmitting assembly.

In the plane roller or the conical one with an obtuse vertex angle, as shown for purposes of illustration in Fig. 2, the rolling friction track must be placed between the two air gaps 10 and 11 to reduce the regulating force required for speed control. To increase the starting torque the rolling friction track 12, on which rolls the non-magnetic rolling ring 13, according to Fig. 15, must be farther displaced here from the roller in the direction of the axis of revolution, e. g., downwardly in Fig. 2 by the distance $a_2$. However, this does not prolong the level arm of the friction force. There it is recommendable to provide the friction track with a friction facing such as a thin layer of rubber bonded to the track by vulcanization, or another well-adhering substance of high friction, or to provide it with a friction surface inclined relative to the direction of contact pressure (Fig. 7). The roller losses are here somewhat displaced from the axis of instantaneous rotation due to the trough shape. They may be displaced farther if the trough consists of laminations and, in the simplest case, the non-insulated compression screws 14 together with the damping ring 15 form a squirrel cage. The trough-shaped laminations 16 are indicated in Fig. 2. The annular core is made up of nested annular laminations. In Fig. 2 the stator comprises wound laminations 17, and laminations 18 arranged in star configuration or involute curves. If no speed control is required for the plane or conical roller, the rolling friction track diameter may be larger than the external diameter of the magnetic circuit, as in the case of the cylindrical roller.

Fig. 1a shows a stator with involute laminations. The same construction may be adopted for the roller, whether or not it is wound. Even in the rolling motor with a plane or conical roller, U- or E-shaped involute laminations similar to part 3 of Figs. 1 and 1a, or 53 of Fig. 9, may be employed in the stator, and even in the unwound roller. However, in that case the U- or E-shape is turned by 90 degrees to be read not in the direction of the axis of revolution, but in the direction of the involute curves, which by necessity lead to inclined slots.

To increase the synchronous torque, the winding of the stator is rather short-pitched. For noiseless running and lower eddy current losses at the roller periphery the winding may be distributed in inclined slots.

Figure 3:
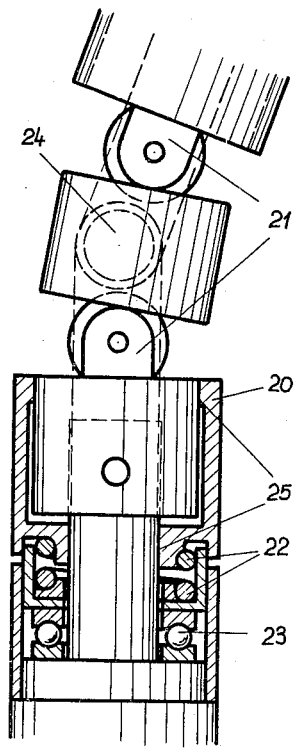

For small adjustable-speed motors previously a simple universal joint has been suggested for transmitting the output torque. For larger angles of inclination of the axis of the roller such universal joint transforms the uniform tumbling motion of the plane roller into a non-uniform, slow rotation. As contrasted therewith, the composite joint according to the invention, illustrated in Figs. 2 and 3, causes a uniform rotation in any direction within the angular range for which it is constructed. This joint is to be called a synchronous tumbling joint because it permits a perfect transmission of a tumbling motion. It comprises a double ball-and-socket joint 19, which is symmetrically guided by two guide tubes 20 with pin carriers 21, two compression springs 22 and two thrust bearings 23. The guide tubes 20 are slewable about an axis which is at right angles to the axes of both tubes.

The two universal joints and the outer races of the two thrust bearings are rigidly connected to the respective shafts, whereas the parts 20, 21, 22 and the inner races of the two thrust bearings are connected with each other and rotatable relative to the respective shaft. They assume the speed of the point of contact (mostly 3600 R. P. M. at 60 cycles per second). The guide tubes with the two springs serve only to hold the pivot 24 of the double joint at the centre between the two universal joints. Since the unsymmetrical forces effective are negligibly small, as long as the pivot is at the center, the springs and thrust bearings may be dimensioned for rather low strength so that the additional gyrating masses and losses are negligibly small. In larger construction the lubricated sliding bearings 25 must be enlarged or replaced by a ball bearing arrangement.

For heavy rollers the gyrating mass may be compensated according to the invention when instead of a gyration of the center of gravity of the roller R with the radius $r$ about the center of gravity of the stator S, as would be the case in a rigid assembly, the roller and stator allowed to gyrate about their common center of gravity Z, Fig. 17. To this end the stator must be mounted with know movable elements interposed for a movement without appreciable losses in a circle whose radius $r_2$ is related to the radius $r_1$ of the gyratory circle of the roller inversely as the means $m_1$ and $m_2$ of the stator and roller, respectively. The stator having about three times the weight of the roller, it must be able to gyrate about the common center gravity with the radius $$r_2 = \frac{r_1}{3} = \frac{r}{4}$$

This affords the further advantage that the moment of gyration decisive for the revolution of the point of contact diminishes by $$\frac{2r_1 r_2}{(r_1 + r_2)^2}$$

In Figs. 1 and 1a two rubber cores 26 and two shins 27 are employed for each bolt extending parallel to the roller axis. For larger weights, four and more bolts, with metal vibration absorbers, or, for still larger weights, silent blocks (suspended inertia blocks) and the like may be employed.

In a machine as shown in Fig. 2, with a plate type roller, a perfect dynamic balance can be achieved when the roller consists of two symmetrically moving parts arranged on mutually opposite sides of a common stator.

Fig. 1 further shows that the roller may be subdivided into telescoped cylindrical tubes, so that the annular laminations may be of a larger width and the magnetic flux in the air gap, being sinusoidal for a 180 degree polearc, is distributed more uniformly at the entrance into the tubes over an arc of 360 degrees. The bobbinlike constrictions alone keep down the core losses in the cylindrical iron core without requiring the use of thin-walled tubes, whereas the subdivision of the iron core into telescoped tubes leads to a better utilization of the material. The thickness of the tubes and the mean induction decreases from the center outwardly. The tubes form a stepped section which can be turned out if necessary from one piece.

Figures 4, 5:
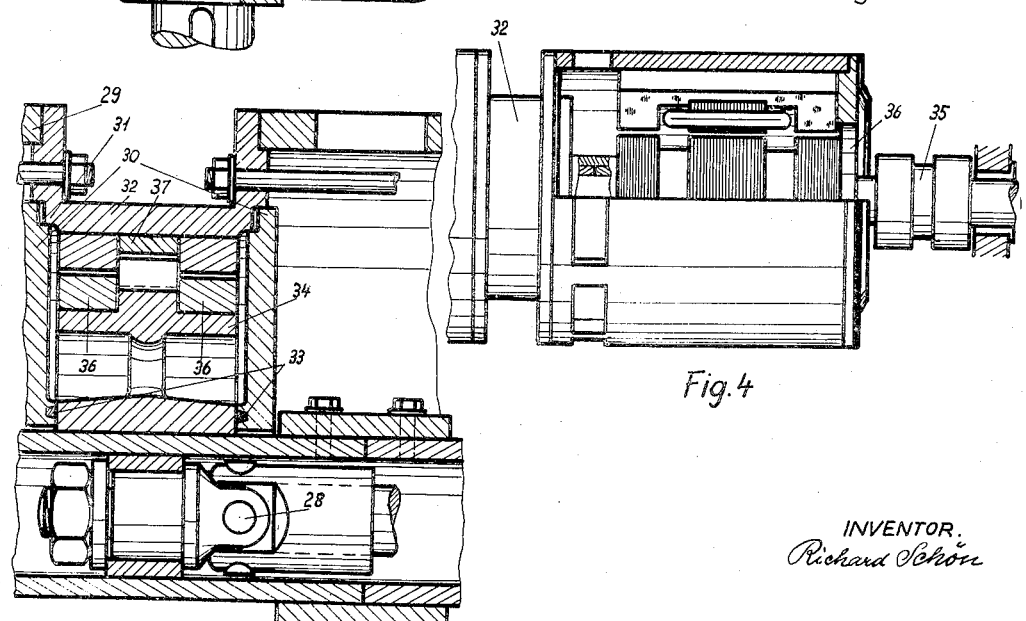
Fig. 4 is a fragmentary view of a twin rolling machine with gear.
Fig. 5 illustrates the oiltight casing shown in Fig. 4.

The output torque is transmitted through a synchronous gearing, which enables a parallel displacement or an inclination of the axis of rotation, e. g., of an appropriate jointed or fished coupling, a flexible shaft or two universal joints. The inner universal joint 28 is shown in Figs. 1 and 5. To achieve an equal load on both rolling contact tracks, the joint must be disposed according to the invention approximately at the center between tracks.

The electric machine with cylindrical roller is primarily for frequent starting and stopping. In this case the advantage of its low moment of inertia is particularly well utilized. For continuous operation a fan 58 to 61, shown in Fig. 16 may be incorporated, which is mounted with lubricated bushes on the outermost supporting tube 2a. Suitably the fan consists of non-magnetic light-weight material, such as the aluminium silicon alloy known under the trade name Silumin, or the like, to which one or several balanced sheets of dynamo plate 60 are fixed e. g. infused over about 1/6 of its periphery. These sheets revolve with the point of contact at about 3600 R. P. M. to drive the fan. The fan blades 59 consist for example of light weight material, the blades 61 opposite to the iron ones 60 consist of non-magnetic material of the same weight, to keep the balance. The bores 63 are for the lubrication. In larger machines a standard fan may be fixed on the rotatably mounted outermost tube or on the rotatably mounted roller. The rotatably mounted roller is shown in Fig. 18. Both the rolling bodies 7b of an e. g. cylindric roller are fastened by the disk 7a on a whole shaft containing the universal joint for driving, while the ferromagnetic core 1 is rotating in bearings embedded in the disk 7a of the two rolling bodies. The ferromagnetic core rotates in this mode similar to an asynchronous motor with about 3600 R. P. M. Thereby the cooling at normal speed is essentially improved, but the efficiency rests almost invariable owing to friction and ventilation losses. This construction is primarily intended for large machines.

Fig. 5 shows a detail of a composite machine with cylindrical rollers (Fig. 4); the electrical part of that machine comprises two rolling electric machines. The inner contact tracks are accommodated in an oil-sealed and sound-lagging housing, together with a spur gear having $n$ teeth and an internal gear having $n-1$ teeth. For assembly, centering rims 29 are required. The oil-tight covers 30 must also be provided with a centering step 31. Between the cover and the housing 32, packing material and washers are provided for a correct adjustment of the pressure applied to the felt gaskets 33, which due to the eccentric movement of the roller bear against the machined end face of the spur gear 34. The gear teeth are milled on the spur gear. Laterally it carries the two rolling discs 36, the diameter of which must be the same as the diameter of the pitch circle of the internal gear. A machined internal face of the housing is formed with the corresponding two rolling contact tracks and the internal gear 37, the track circles have the same diameter as the pitch circle. The oil level is below the felt gaskets 33. The inner universal joint 28 for transmitting the output torque is mounted inside the hub of the spur. The outer ball-and-socket joint 35 is close to the next stationary bearing. Similarly a sealed external bevel gearing with rolling contact tracks may be arranged with the conical roller for a particularly high transmission ratio.

Similarly to the construction of the cylindrical roller of tubes and flat laminated rings, the conical roller may be composed of plates 38, 39 and 40 (Fig. 6) and of wound laminations 41; even the stator may be composed of plates 42 and wound laminations 43. In this case too the magnetic flux is distributed between the air gap and the plate almost evenly throughout the periphery so, that particularly the outer plates may consist of magnet steel. In the stator the winding interferes to some extent with that distribution. For this reason the uppermost plate 42a is to be provided with laminations approximately in star configuration, unless U-shaped involute laminations are preferred for the stator.

Fig. 7 shows a contact track whose contact surface is inclined by about 15 degrees against the direction of the contact pressure to increase the peripheral force by about three times. This construction is suggested for the adjustable conical roller and also for the cylindric roller if in the latter case the large diameter of the rolling friction track is undesirable.

Where the stator and roller are in geared mesh a much smaller contact pressure is required but care must be taken that the time of tooth engagement be not too long. It is suggested to make the angle of inclination of the path of contact of the teeth relative to the centre line larger than 75 degrees. With that arrangement, a lifting of the gear upon sudden load variations will occur only in extreme cases and can be avoided entirely when the inclination exceeds the angle $90°-\rho$, where $\rho$ is the angle of friction for the oil-lubricated sides of the teeth in operation.

Figs. 8 and 11 show a plane roller and a conical roller, respectively, in machines whose magnetic circuit surrounds both winding ends. The roller of Fig. 8 comprises a trough 44 for high-torque starting, with a divided starting squirrel cage, which may remain uninsulated, if desired. That cage consists of the brass rings 46, the rings 47 and 48, which in an insulated construction may consist of resistance material, and the connecting bolts 49, 50, which at the same time compress the lamellation. The trough 45 for the run contains insulated compression screws 51. When starting the magnetic flux is carried mainly by the inner trough, whereas running at full speed the outer trough has the smaller reluctance and the inner trough then carries only a small magnetic flux. The top plan view of the corresponding stator is shown in Fig. 9. When the winding 52 has been completed, the involute laminations 53 bent before are put in first the laterally bent laminations 53a of Fig. 10, then the others, and thereafter the U-shaped winding support 54, which terminates at the bent coil ends. The inner ends of the involute laminations are leaning on the annular laminations 43a, which are stepped. The number of stator plates is reduced to two rings of rectangular cross section. The wound laminations 43 are supported on the centered ring 55. On the outside a ring 56, composed of three or more parts, is put on, which has a conical outer periphery. The conical rings 57 compress the stator. Fig. 9 shows that the two-plane winding has a winding pitch of 90° and that the involute laminations are externally provided with interlayers 54a for ventilating the laminations and winding.

According to Fig. 11 the roller and stator are similiar to a great extent. In this case the rolling contact track is arranged above the winding. For this reason it is suggested to give the wound laminations of the roller such a width that by this design the forces exercised by the roller currents are sufficiently displaced from the axis of instantaneous rotation, without requiring an additional widening of the track engaging ring 13. This type is particularly suitably for the installation of a winding in the roller.

I claim:

1. In a rolling electric machine the combination of a stator having a wound and laminated core adapted to produce a rotating field and provided with at least one annular rolling friction track, its lamination formed with developable flux transition faces, and a roller with a ferromagnetic core provided with coaxial developable flux transition faces forming at least two air gaps between the roller and the stator, said roller containing at least one current conducting part, in which in limited amount currents are inductible from the rotating field, said roller provided with at least one rolling body contacting the friction track of the stator in a circulating point, said flux transition faces forming a corresponding shortest magnetic air gap, diameter and axial position of said friction track and rolling body so adapted, that the circulating contact point of the track is removed from the current conducting part of the roller in direction of the corresponding shortest air gap, i. e. normal to the roller's flux transition face.

2. The combination set forth in claim 1, in which said laminated core consists of sheets formed according to involute curves.

3. The combination set forth in claim 1, in which the winding is distributed in inclined slots.

4. The combination set forth in claim 1, in which said ferromagnetic core is laminated at the protruding flux transition faces whereas its solid part being current conducting represents the said current conducting part.

5. The combination set forth in claim 1, in which said ferromagnetic core is a solid permanent magnet supporting the protruding lamination forming protruding flux transition faces.

6. The combination set forth in claim 1, in which said ferromagnetic core consists of at least one solid part with stepped sitting surface supporting the protruding lamination, forming protruding flux transition faces.

7. The combination set forth in claim 1, in which said ferromagnetic core is formed by a tubular member and which comprises a second annular rolling friction track on said stator, a second rolling body placed on said roller operating in the same manner as the first mentioned track and rolling body, and a flexible torque transmission member fixed inside said tubular member at the centre between said two equal rolling bodies, to ensure the transmission of the same torque at both said tracks.

8. The combination set forth in claim 1, in which said ferromagnetic core is provided with a rotatably mounted fan of non-magnetic material.

9. The combination set forth in claim 1, in which said ferromagnetic core is formed by a tubular member provided with two rolling bodies, these being fastened on a common connecting shaft.

10. The combination set forth in claim 1, the stator carrying at its ends two tubes, forming at its inner side said two friction tracks, the roller carrying two disks forming at it's outer side said two rolling bodies, larger in diameter than the roller's flux transition faces, contacting each of the stator's friction tracks in one circulating point.

11. The combination set forth in claim 1, the stator carrying at its ends two tubes, forming at its outer side said two friction tracks, the roller carrying two disks with rings, forming at its inner side said two rolling bodies contacting each of the stator's friction tracks in one circulating point.

12. The combination set forth in claim 1, the stator's annular friction track and the rotor's rolling body formed by a gearing with at least one rolling track and friction disk, the diameters of which being the pitch circle diameters of the gearing, and an oil-tight casing accommodating an oil bath and said two gears immersed in said oil bath.

13. The combination set forth in claim 1, which comprises means mounting said stator so far resiliently movable, that the centre of gravity of the machine remains at rest in operation, said means comprising a supporting structure carrying said stator by resilient elements.

14. The combination set forth in claim 1 with at least two conic flux transition faces between the roller and the stator with large apex angles inclusively straight ones, the stator's laminated core containing wound sheets.

15. The combination set forth in claim 1 with at least two conic flux transition faces between the roller and the stator with large apex angles inclusively straight ones, the roller's faces protruding by its trough-shaped lamination.

16. The combination set forth in claim 1 with at least two conic flux transition faces between the roller and the stator with large apex angles inclusively straight ones, the roller's ferromagnetic core formed by solid plates with stepped sitting surface supporting the wound lamination, forming protruding flux transition faces.

17. The combination set forth in claim 1 with at least two conic flux transition faces between the roller and the stator with large apex angles inclusively straight ones, the roller nutatably mounted for tumbling motion by a synchronous tumbling joint.

18. The combination set forth in claim 1 with at least two conic flux transition faces between the roller and the stator with large apex angles inclusively straight ones, said rolling body consisting in a tubular rolling ring protruding over the flux transition face between the roller and the stator.

19. The combination set forth in claim 1 with at least two conic flux transition faces between the roller and the stator with large apex angles inclusively straight ones, the roller provided with a starting cage.

20. The combination set forth in claim 1, which comprises a layer of nonmagnetic friction material forming at least one of the mutually contacting surfaces of track and rolling body.

21. The combination set forth in claim 1, in which said friction track has for engagement by said rolling body a contact surface extending at an angle of less than 45 degrees relative to the direction of the magnetic field in the air gap.

22. The combination set forth in claim 1, the stator's lamination provided with three developable flux transition faces forming two magnetic circles with three air gaps.

References Cited in the file of this patent

UNITED STATES PATENTS

| | | |
|---|---|---|
| 586,823 | Patten | July 20, 1897 |
| 1,486,965 | Janney | Mar. 18, 1924 |
| 1,495,784 | Fereday | May 27, 1924 |
| 2,275,827 | Plenser | Mar. 10, 1942 |
| 2,378,668 | Vickers | June 19, 1945 |
| 2,378,669 | Vickers | June 19, 1945 |
| 2,579,865 | Roters | Dec. 25, 1951 |
| 2,703,370 | Steensen | Mar. 1, 1955 |

FOREIGN PATENTS

| | | |
|---|---|---|
| 384,926 | Germany | Nov. 27, 1923 |
| 63,141 | Netherlands | May 16, 1949 |